US009867261B2

(12) United States Patent
Lo et al.

(10) Patent No.: US 9,867,261 B2
(45) Date of Patent: Jan. 9, 2018

(54) LIGHT EMITTING DEVICE WITH DIMMING VISIBLE LIGHT COMMUNICATION FUNCTION AND INTERACTION DEVICE APPLYING FOR VISIBLE LIGHT

(71) Applicant: Generalplus Technology Inc., Hsinchu (TW)

(72) Inventors: Li Sheng Lo, Zhubei (CN); Hsien-Yao Li, Hsinchu (TW)

(73) Assignee: Generalplus Technology Inc., Hsinchu (TW)

(*) Notice: Subject to any disclaimer, the term of this patent is extended or adjusted under 35 U.S.C. 154(b) by 0 days.

(21) Appl. No.: 15/481,945

(22) Filed: Apr. 7, 2017

(65) Prior Publication Data

US 2017/0295627 A1 Oct. 12, 2017

Related U.S. Application Data

(60) Provisional application No. 62/320,127, filed on Apr. 8, 2016.

(51) Int. Cl.
*H05B 37/02* (2006.01)
*H05B 33/08* (2006.01)
(Continued)

(52) U.S. Cl.
CPC ......... *H05B 37/0272* (2013.01); *A63H 3/003* (2013.01); *A63H 3/006* (2013.01);
(Continued)

(58) Field of Classification Search
CPC ............ H05B 37/0272; H05B 33/0833; H05B 33/0845; H05B 33/0854; H04B 10/00;
(Continued)

(56) References Cited

U.S. PATENT DOCUMENTS

2011/0222849 A1* 9/2011 Han .................. H04B 10/1149 398/25
2012/0249013 A1* 10/2012 Valois ................ H05B 37/0227 315/291
(Continued)

*Primary Examiner* — Jason M Crawford
(74) *Attorney, Agent, or Firm* — Muncy, Geissler, Olds & Lowe, P.C.

(57) ABSTRACT

A light emitting device with a dimming visible light communication function and an interaction device applying for visible light are provided. The light emitting device with the dimming visible light communication function comprises a luminance adjusting unit, a control circuit and a light emitting device. The luminance adjusting unit outputs a luminance adjusting signal according to luminance adjusted by a user. The control circuit coupled to the luminance adjusting unit outputs a pulse width modulation (PWM) signal according to the luminance adjusting signal. The light emitting device outputs visible light, receives the PWM signal, and is turned on or off according to states of a logic high voltage and a logic low voltage of the PWM signal. In an idle mode, the PWM signal operates at a first frequency. In a light communication mode, an operating frequency of the PWM signal is changed according to transmitted data.

13 Claims, 5 Drawing Sheets

302
luminance adjusting unit
LA
control circuit
301
PWM
303

(51) Int. Cl.
*H04B 10/116* (2013.01)
*H04B 10/524* (2013.01)
*A63H 3/00* (2006.01)
*A63H 3/28* (2006.01)
*A63H 30/04* (2006.01)

(52) U.S. Cl.
CPC ............... *A63H 3/28* (2013.01); *A63H 30/04* (2013.01); *H04B 10/116* (2013.01); *H04B 10/524* (2013.01); *H05B 33/0854* (2013.01)

(58) Field of Classification Search
CPC .... H04B 10/50; H04B 10/502; H04B 10/516; H04B 10/5161; H04B 10/524; H04B 10/548
See application file for complete search history.

(56) References Cited

U.S. PATENT DOCUMENTS

| | | | | |
|---|---|---|---|---|
| 2013/0334971 A1* | 12/2013 | Jones | H05B 37/0272 | 315/151 |
| 2014/0375217 A1* | 12/2014 | Feri | H05B 37/0272 | 315/151 |
| 2015/0078743 A1* | 3/2015 | Yang | H04B 10/116 | 398/38 |
| 2015/0280820 A1* | 10/2015 | Breuer | H04B 10/116 | 398/128 |
| 2016/0295659 A1* | 10/2016 | Jones | H05B 37/0272 | |
| 2017/0079106 A1* | 3/2017 | Kido | H05B 33/0854 | |

* cited by examiner

LIGHT EMITTING DEVICE WITH DIMMING VISIBLE LIGHT COMMUNICATION FUNCTION AND INTERACTION DEVICE APPLYING FOR VISIBLE LIGHT

This application claims priority to U.S. Provisional Patent Application Ser. No. 62/320,127 filed on Apr. 8, 2016 which is incorporated herein by reference in its entirety.

BACKGROUND OF THE INVENTION

Field of the Invention

The invention relates to the light communication technology, and more particularly to a light emitting device with a dimming visible light communication function and an interaction device applying for visible light.

Description of the Related Art

FIG. 1 shows signal waveforms of visible light communication according to the prior art. FIG. 1 shows the visible light communication protocol (VLC Protocol) specified by IEEE 802.15.7. The VLC protocol adopts Manchester encoding. In the specification of this VLC protocol, the luminance control adopts the pulse width modulation (PWM) control plus the pulse position modulation (PPM) control.

In the previously proposed technology, it is difficult to achieve the signal communication synchronization, and the flickering phenomenon tends to occur at the lower communication frequency when logic 0 is switched to logic 1 and when logic 1 is switched to logic 0, as shown in FIG. 2. FIG. 2 shows the waveform of light communication upon transmission of "000110" according to the prior art. Referring to FIG. 2, symbol 201 represents the waveform when logic 0 is switched to logic 1; and symbol 202 represents the waveform when logic 1 is switched to logic 0. In this case, the human eyes can easily feel the flickering.

This disclosure proposes the simpler communication technology, in which the signal synchronization is more convenient, and the flickering phenomenon cannot be easily seen.

SUMMARY OF THE INVENTION

An objective of the invention is to provide a light emitting device with a dimming visible light communication function and an interaction device applying for visible light, in which the original specification is changed, and the data is transmitted by way of pulse width modulation, so that the flickering condition cannot occur upon data transmission or luminance adjustment.

In view of this, the invention provides a light emitting device with a dimming visible light communication function. The light emitting device transmits data to a receiver device, and comprises a luminance adjusting unit, a control circuit and a light emitting device. The luminance adjusting unit outputs a luminance adjusting signal according to luminance adjusted by a user. The control circuit coupled to the luminance adjusting unit outputs a pulse width modulation (PWM) signal according to the luminance adjusting signal. The light emitting device outputs visible light, is coupled to the control circuit, and receives the PWM signal. In addition, the light emitting device outputs a light communication signal according to the received PWM signal.

The light emitting device is turned on or off according to states of a logic high voltage and a logic low voltage of the PWM signal. The light emitting device has an idle mode and a light communication mode. In the idle mode, the PWM signal operates at a first frequency. In the light communication mode, the control circuit changes an operating frequency of the PWM signal according to to-be-transmitted data.

The invention further provides an interaction device comprising a light emitting device with a dimming visible light communication function, and a receiver device. The light emitting device with the dimming visible light communication function comprises a luminance adjusting unit, a control circuit and a light emitting device. The luminance adjusting unit outputs a luminance adjusting signal according to luminance adjusted by a user. The control circuit coupled to the luminance adjusting unit outputs a pulse width modulation (PWM) signal according to the luminance adjusting signal. The light emitting device outputs visible light, is coupled to the control circuit, and receives the PWM signal. In addition, the light emitting device outputs a light communication signal according to the received PWM signal. The light emitting device is turned on or off according to states of a logic high voltage and a logic low voltage of the PWM signal. The light emitting device has an idle mode and a light communication mode. In the idle mode, the PWM signal operates at a first frequency. In the light communication mode, the PWM signal operates at a second frequency or a third frequency according to the transmitted data. The receiver device receives the light communication signal, and performs an interaction operation according to the light communication signal.

In the light emitting device with the dimming visible light communication function and the interaction device according to the preferred embodiment of the invention, the light emitting device comprises a light-emitting diode (LED) string, which is coupled to the control circuit and receives the PWM signal. Also, in a preferred embodiment, the receiver device comprises a light sensing element, an edge detector, a timing detection circuit and a decoder circuit. The light sensing element converts the received light communication signal into an electric signal. The edge detector coupled to the light sensing element receives the electric signal and performs an edge detection on the electric signal to output an edge detection signal. The timing detection circuit coupled to the edge detector receives the edge detection signal to determine a period of the electric signal. The decoder circuit coupled to the timing detection circuit determines a frequency of the light communication signal according to the period of the electric signal, and decodes the light communication signal into the transmitted data.

In the light emitting device with the dimming visible light communication function and the interaction device according to the preferred embodiment of the invention, the receiver device further comprises an output circuit, which is coupled to the decoder circuit, and performs an interaction operation according to the transmitted data. In a preferred embodiment, the light sensing element comprises a photodiode, which comprises an anode end and a cathode end, wherein the anode end of the photodiode is coupled to a common voltage, and the cathode end of the photodiode outputs the electric signal. In a preferred embodiment, the light emitting device is a smart phone, wherein luminance of a LED of the smart phone is adjusted to output the light communication signal.

The invention further provides a visible light communication method for adjusting luminance. The visible light communication method comprises the steps of: providing a light emitting device; providing the light emitting device with a PWM signal, wherein the light emitting device is turned off when the PWM signal is in a first state, and the light emitting device is turned on when the PWM signal is in a second state; setting the PWM signal to a first frequency when the light emitting device is idle; setting the PWM signal to a second frequency when the light emitting device transmits first data; setting the PWM signal to a third frequency when the light emitting device transmits second data; and adjusting the luminance outputted by the light emitting device by changing a pulse width of the PWM signal.

The essence of the invention is to change the original Manchester encoding light communication technology to the technology of transmitting the data according to the transmission data basis utilizing the PWM signal in conjunction with the frequency change. Because the PWM signal can adjust the luminance of the light emitting device according to the pulse width, the data can be transmitted and the luminance can be adjusted. In addition, the prior art flickering problem is solved.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 1:
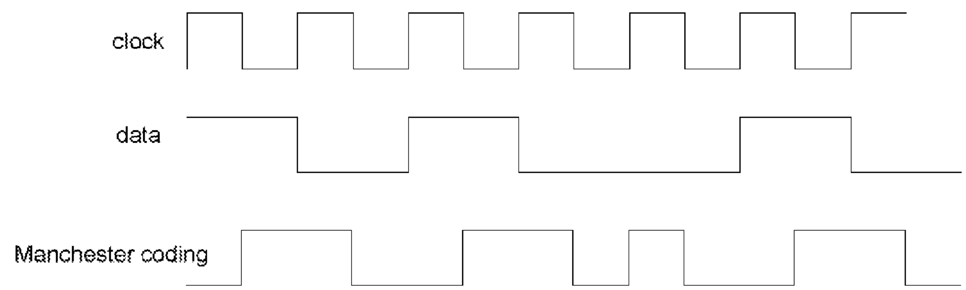
FIG. 1 shows signal waveforms of visible light communication according to the prior art.
Figure 2:
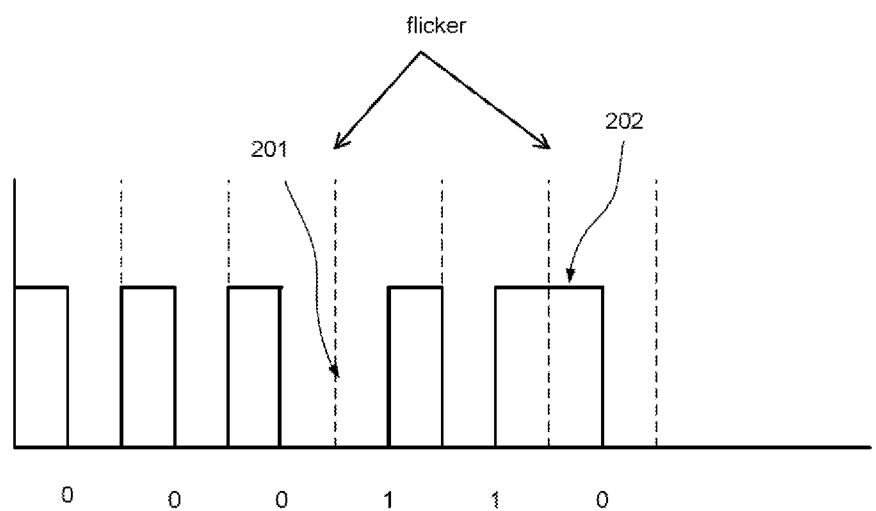
FIG. 2 shows the waveform of light communication upon transmission of "000110" according to the prior art.
Figure 3:
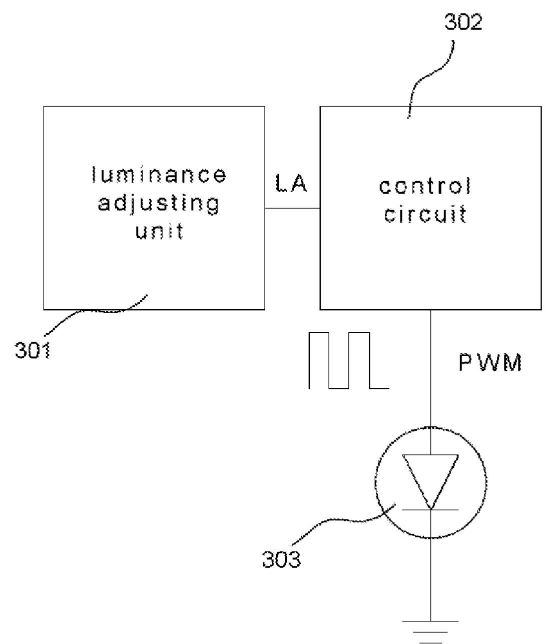
FIG. 3 is a circuit block diagram showing a light emitting device with a dimming visible light communication function according to a preferred embodiment of the invention.

FIG. 3 is a circuit block diagram showing a light emitting device with a dimming visible light communication function according to a preferred embodiment of the invention. Referring to FIG. 3, the light emitting device transmits data to a receiver device, and comprises a luminance adjusting unit 301, a control circuit 302 and a light emitting device 303. The luminance adjusting unit 301 outputs a luminance adjusting signal LA according to luminance adjusted by a user. The control circuit 302 coupled to the luminance adjusting unit 301 outputs a pulse width modulation signal PWM according to the luminance adjusting signal LA. The light emitting device 303 coupled to the control circuit 302 receives the pulse width modulation signal PWM. In this embodiment, it is assumed that the light emitting device 303 is a light-emitting diode (LED), that the LED is turned on to emit light when the pulse width modulation signal PWM is at the logic high voltage; and that the LED is turned off to stop emitting light when the pulse width modulation signal PWM is at the logic low voltage.

Figure 4:
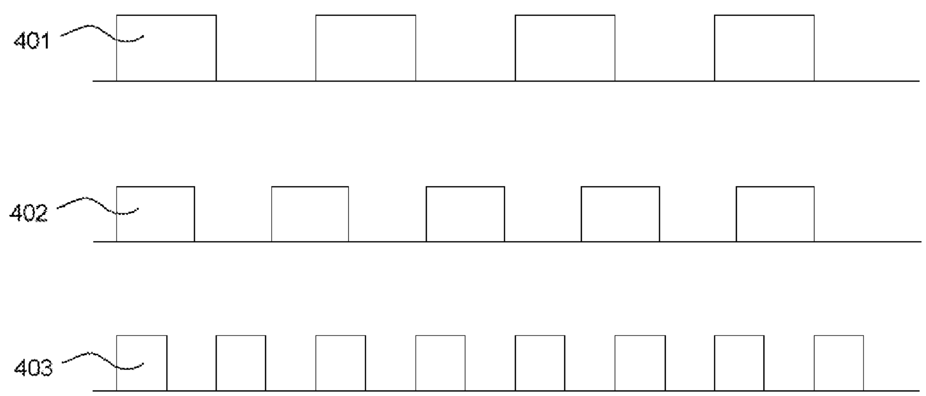
FIG. 4 shows operation waveforms of a light emitting device with a dimming visible light communication function according to a preferred embodiment of the invention.

FIG. 4 shows operation waveforms of a light emitting device with a dimming visible light communication function according to a preferred embodiment of the invention. Referring to FIG. 4, waveform 401 represents the waveform of the pulse width modulation signal PWM when the light emitting device with the dimming visible light communication function is in an idle mode; waveform 402 represents the waveform of the pulse width modulation signal PWM when the light emitting device with the dimming visible light communication function is emitting the first logic; and waveform 403 represents the waveform of the pulse width modulation signal PWM when the light emitting device with the dimming visible light communication function is emitting the second logic. For the sake of illustration in this embodiment, it is assumed that the waveform 401 has the frequency of 100 HZ, the waveform 402 has the frequency of 150 HZ, and the waveform 403 has the frequency of 200 HZ. When no data is transmitted, the light emitting device with the dimming visible light communication function is in an idle mode. At this time, the pulse width modulation signal PWM is fixed at an idle frequency (100 HZ). When the user adjusts the luminance, the pulse width of the pulse width modulation signal PWM is changed, while the idle frequency is kept unchanged.

Figure 5:
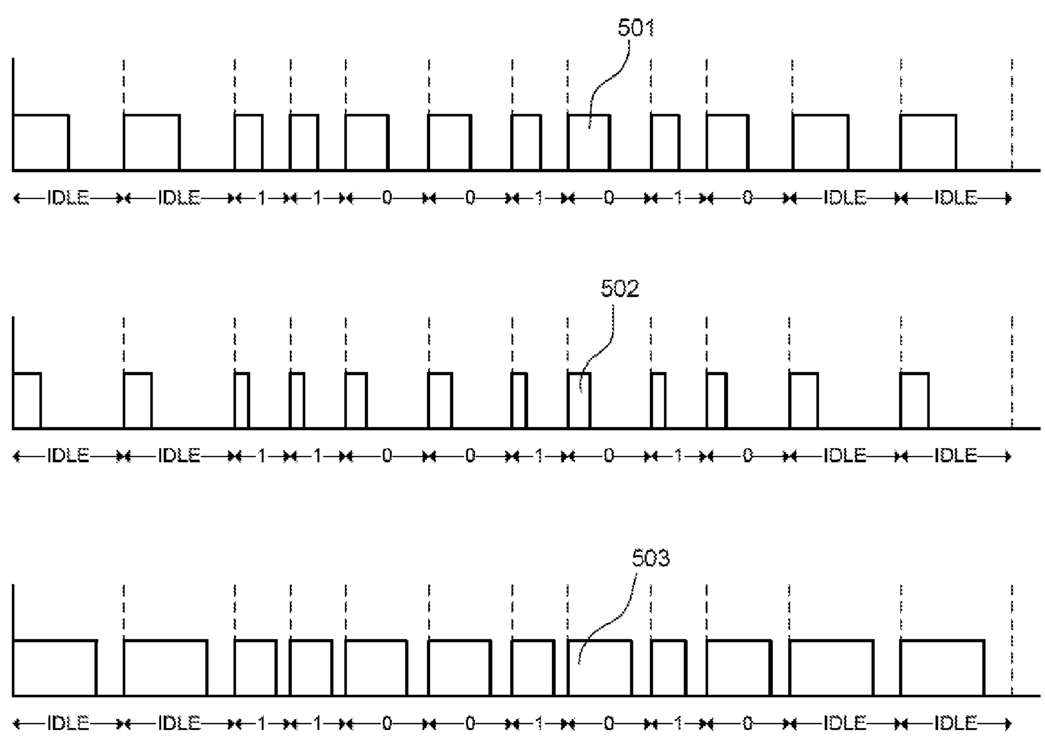
FIG. 5 shows operation waveforms of a light emitting device with a dimming visible light communication function upon transmission of "11001010" according to a preferred embodiment of the invention.

When the light emitting device with the dimming visible light communication function starts transmitting data, the light emitting device with the dimming visible light communication function is switched from the idle mode to the data transmission mode. At this time, the pulse width modulation signal PWM is changed between 150 HZ and 200 HZ according to the transmitted data. For example, when the transmission logic is 0, the frequency of the pulse width modulation signal PWM is changed to 150 HZ; and when the transmission logic is 1, the frequency of the pulse width modulation signal PWM is changed to 200 HZ. FIG. 5 shows operation waveforms of a light emitting device with a dimming visible light communication function upon transmission of "11001010" according to a preferred embodiment of the invention. Referring to FIG. 5, waveform 501 represents the waveform of the light emitting device with the dimming visible light communication function when "11001010" is transmitted and the duty cycle is 50%; waveform 502 represents the waveform of the light emitting device with the dimming visible light communication function when "11001010" is transmitted and the duty cycle is 25%; and waveform 503 represents the waveform of the light emitting device with the dimming visible light communication function when "11001010" is transmitted and the duty cycle is 75%. Referring to FIG. 5, the decoder end only needs to detect the interval time between edges of the two pulses to judge the transmitted data. Even if the duty cycle is changed, the interval time between the edges cannot be changed with the change of the pulse width.

Figure 6:
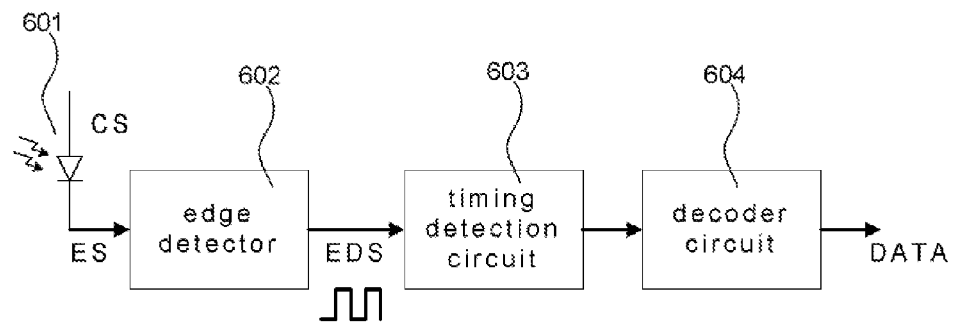
FIG. 6 is a circuit block diagram showing a receiver device according to a preferred embodiment of the invention.

FIG. 6 is a circuit block diagram showing a receiver device according to a preferred embodiment of the invention. Referring to FIG. 6, the receiver device comprises a light sensing element 601, an edge detector 602, a timing detection circuit 603 and a decoder circuit 604. Generally speaking, the light sensing element 601 is implemented by a photodiode. However, those skilled in the art should know that the light sensing element 601 may also be implemented using a LED or a photoresistor (CDS), so the invention is not restricted thereto. The light sensing element 601 converts the received light communication signal CS into an electric signal ES.

The edge detector 602 coupled to the light sensing element 601 receives the electric signal ES outputted from the light sensing element 601, and performs an edge detection on the electric signal ES to output an edge detection signal EDS. The timing detection circuit 603 coupled to the edge detector 602 receives the edge detection signal EDS to determine the period of the electric signal ES. The decoder circuit 604 coupled to the timing detection circuit 603 determines the frequency of the light communication signal CS according to the period of the electric signal ES, and decodes the light communication signal CS into the transmitted data.

Figure 7:
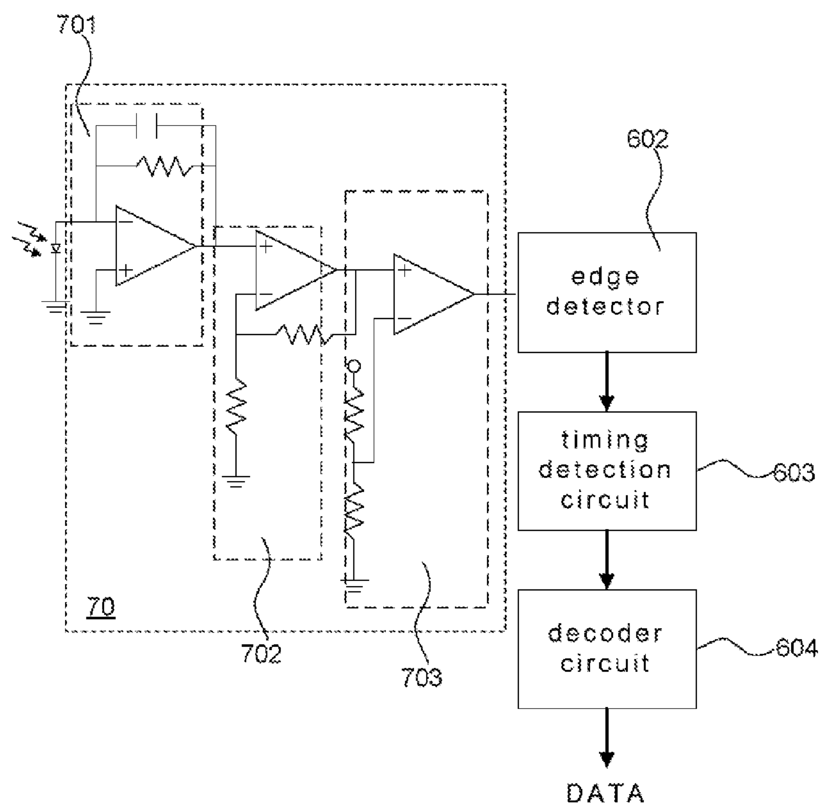
FIG. 7 is a circuit block diagram showing a receiver device according to a preferred embodiment of the invention.

FIG. 7 is a circuit block diagram showing a receiver device according to a preferred embodiment of the invention. Referring to FIGS. 6 and 7, a filter amplifier circuit 70 is additionally added to this embodiment to filter out the noise of the electric signal and amplify the electric signal to facilitate the subsequent decoding process. Also, the filter amplifier circuit is divided into a filter circuit 701, an amplifier circuit 702 and a comparator circuit 703. The first stage of filter circuit 701 is composed of one or multiple amplifiers, one or multiple resistors, and one or multiple capacitors. The filter circuit 701 is a transimpedance amplifier. The above-mentioned RC low-pass filter can filter out the high-frequency noise of the electric signal ES. The second stage of circuit is the voltage amplifier for amplifying the voltage of the electric signal ES. The third stage of circuit is the comparator for outputting a positive saturation voltage and a negative saturation voltage according to the electric signal ES to be decoded by the subsequent circuit.

Figure 8:
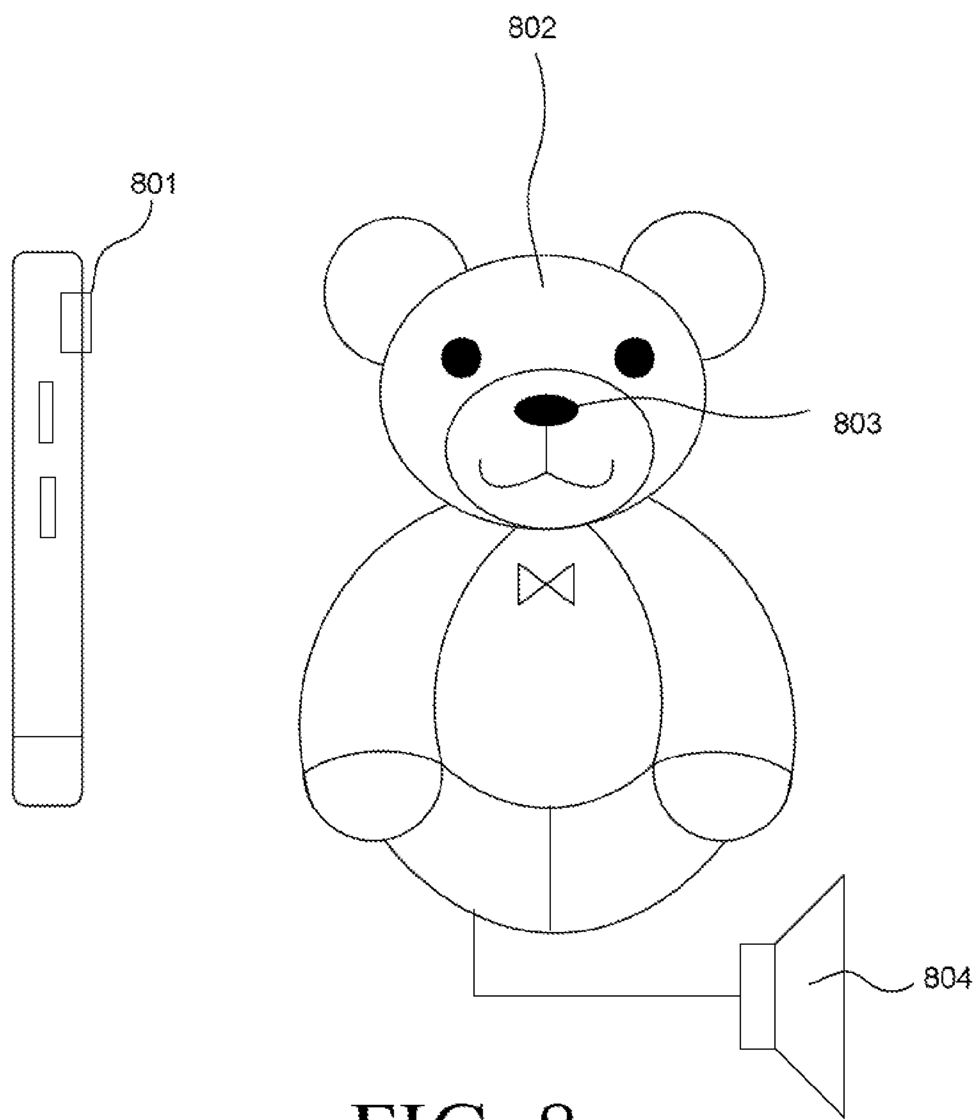
FIG. 8 is a schematic view showing an interaction device according to a preferred embodiment of the invention.

FIG. 8 is a schematic view showing an interaction device according to a preferred embodiment of the invention. Referring to FIG. 8, the interaction device of this embodiment comprises the light emitting device (a mobile device 801) with the dimming visible light communication function and a receiver device 802. For example, the mobile device 801 is a smart phone, and the receiver device 802 is a toy bear. A light sensing element 803 and an output circuit 804 are further depicted on the receiver device 802. Generally speaking, the output circuit 804 is coupled to the decoder circuit 604 of the receiver device 802 (not shown here). The mobile device 801 (smart phone) is installed with a specific application program (APP). After the specific application program APP is executed, the rear LED outputs the light communication signal CS according to the user's clicking or sliding control. The light sensing element 803 of the receiver device 802 (toy bear) receives the light communication signal CS, which is decoded and then the corresponding interaction operation is executed through the output circuit 804 according to the decoded data. If the output circuit 804 is a speaker, then the interaction operation is the audio. However, the output circuit 804 is not restricted to the speaker. If the output circuit 804 comprises the mechanism, such as a motor, the hand and foot operations of the toy bear may also be controlled. So, the invention is not restricted thereto.

In addition, although the above-mentioned embodiment is described by taking the example, in which the transmission data is logic 0 at 150 HZ, and the transmission data is logic 1 at 200 HZ, those skilled in the art should know that the transmission data is not restricted to logic 0 or logic 1 only. A designer, after referring to the invention, can use four different frequencies to transmit the data, and the four different frequencies may represent 00, 01, 10 and 11, respectively. Thus, the invention is not restricted thereto.

In summary, the essence of the invention is to change the original Manchester encoding light communication technology to the technology of transmitting the data according to the transmission data basis utilizing the PWM signal in conjunction with the frequency change. Because the PWM signal can adjust the luminance of the light emitting device according to the pulse width, the data can be transmitted and the luminance can be adjusted. In addition, the prior art flickering problem is solved.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A light emitting device with a dimming visible light communication function, the light emitting device being for transmitting data to a receiver device and comprising:

a luminance adjusting unit outputting a luminance adjusting signal according to luminance adjusted by a user;

a control circuit, which is coupled to the luminance adjusting unit and outputs a pulse width modulation (PWM) signal according to the luminance adjusting signal; and a light emitting device for outputting visible light, wherein the light emitting device is coupled to the control circuit, receives the PWM signal, and outputs a light communication signal according to the PWM signal, wherein the light emitting device is turned on or off according to states of a logic high voltage and a logic low voltage of the PWM signal;

wherein the light emitting device has an idle mode and a light communication mode, the PWM signal operates at a first frequency in the idle mode, and the control circuit changes an operating frequency of the PWM signal according to the to-be-transmitted data in the light communication mode.

2. The light emitting device according to claim 1, wherein the light emitting device comprises:

a light-emitting diode (LED) string coupled to the control circuit and receiving the PWM signal.

3. The light emitting device according to claim 1, wherein in the light communication mode, the PWM signal is operated at a second frequency when the to-be-transmitted data is at first logic, wherein in the light communication mode, the PWM signal is operated at a third frequency when the to-be-transmitted data is at second logic.

4. The light emitting device according to claim 1, wherein the receiver device comprises:

a light sensing element converting the received light communication signal into an electric signal;

an edge detector, which is coupled to the light sensing element, receives the electric signal, and performs an edge detection on the electric signal to output an edge detection signal;

a timing detection circuit, which is coupled to the edge detector, and receives the edge detection signal to determine a period of the electric signal; and a decoder circuit, which is coupled to the timing detection circuit, determines a frequency of the light communication signal according to the period of the electric signal, and decodes the light communication signal into transmitted data.

5. The light emitting device according to claim 4, wherein the receiver device further comprises:

an output circuit coupled to the decoder circuit, and performing an interaction operation according to the transmitted data.

6. The light emitting device according to claim 4, wherein the light sensing element comprises:

a photodiode comprising an anode end and a cathode end, wherein the anode end of the photodiode is coupled to a common voltage, and the cathode end of the photodiode outputs the electric signal.

7. An interaction device, comprising:

a light emitting device with a dimming visible light communication function, the light emitting device comprising:

a luminance adjusting unit outputting a luminance adjusting signal according to luminance adjusted by a user;

a control circuit, which is coupled to the luminance adjusting unit, and outputs a pulse width modulation (PWM) signal according to the luminance adjusting signal; and a light emitting device for outputting visible light, wherein the light emitting device is coupled to the control circuit, receives the PWM signal, and outputs a light communication signal according to the PWM signal, wherein the light emitting device is turned on or off according to states of a logic high voltage and a logic low voltage of the PWM signal, wherein the light emitting device has an idle mode and a light communication mode, the PWM signal operates at a first frequency in the idle mode, and the control circuit changes an operating frequency of the PWM signal according to the to-be-transmitted data in the light communication mode; and a receiver device for receiving the light communication signal, and performing an interaction operation according to the light communication signal.

8. The interaction device according to claim 7, wherein the light emitting device comprises:

a light-emitting diode (LED) string, which is coupled to the control circuit and receives the PWM signal.

9. The interaction device according to claim 7, wherein in the light communication mode, the PWM signal is operated at a second frequency when the to-be-transmitted data is at first logic, wherein in the light communication mode, the PWM signal is operated at a third frequency when the to-be-transmitted data is at second logic.

10. The interaction device according to claim 7, wherein the receiver device comprises:

a light sensing element converting the received light communication signal into an electric signal;

an edge detector, which is coupled to the light sensing element, receives the electric signal, and performs an edge detection on the electric signal to output an edge detection signal;

a timing detection circuit, which is coupled to the edge detector and receives the edge detection signal to determine a period of the electric signal; and a decoder circuit, which is coupled to the timing detection circuit, determines a frequency of the light communication signal according to the period of the electric signal and decodes the light communication signal into transmitted data.

11. The interaction device according to claim 10, wherein the receiver device further comprises:

an output circuit, which is coupled to the decoder circuit, and performs an interaction operation according to the transmitted data.

12. The interaction device according to claim 10, wherein the light sensing element comprises:

a photodiode comprising an anode end and a cathode end, wherein the anode end of the photodiode is coupled to a common voltage, and the cathode end of the photodiode outputs the electric signal.

13. The interaction device according to claim 7, wherein the light emitting device is a smart phone, which outputs the light communication signal by adjusting luminance of a light-emitting diode (LED) of the smart phone.

* * * * *